US005179396A

United States Patent [19]

Jeong

[11] Patent Number: 5,179,396

[45] Date of Patent: Jan. 12, 1993

[54] LIGHT EMITTING DIODE PRINT HEAD

[75] Inventor: Seung-Sik Jeong, Suwon, Rep. of Korea

[73] Assignee: Samsung Electronics Co., Ltd., Suwon, Rep. of Korea

[21] Appl. No.: 744,930

[22] Filed: Aug. 14, 1991

[30] Foreign Application Priority Data

Feb. 21, 1991 [KR] Rep. of Korea .................. 1991-2848

[51] Int. Cl.[5] ........................ G01D 15/06; G01D 15/14

[52] U.S. Cl. .................................. 346/160; 346/107 R

[58] Field of Search ................. 346/107 R, 153.1, 160

[56] References Cited

U.S. PATENT DOCUMENTS

| | | | |
|---|---|---|---|
| 4,571,602 | 2/1986 | DeSchamphelaere et al. | 346/160 |
| 4,700,206 | 10/1987 | Yamakawa | 346/160 |
| 4,875,057 | 10/1989 | Hediger et al. | 346/107 R |
| 4,916,464 | 4/1990 | Ito et al. | 346/160 X |
| 5,005,029 | 4/1991 | Fuse | 346/107 R |

*Primary Examiner*—Fred L. Braun
*Attorney, Agent, or Firm*—Robert E. Bushnell

[57] ABSTRACT

In a light emitting diode print head of the dynamic drive method type including an upper substrate having a transversely elongated opening, a plurality of common electrodes arranged on the first side region of the opening of the upper substrate in parallel therewith, a plurality of light emitting diode array chips each mounted on one of the common electrodes, a plurality of drive circuits arranged on the second side region of the opening of the upper substrate, a plurality of drive ICs mounted on the upper substrate between the opening and the drive circuits, the number of the drive ICs being the same as that of the array chips, a lower substrate divided into a plurality of wiring regions and having the same size as that of the upper substrate, the number of the wiring regions being the same as that of the drive ICs, and a plurality of individual electrode wirings of undulated form arranged on the wiring regions along the length of the lower substrate and corresponding to the electrode pads of the light emitting diode array chips, wherein the upper substrate is mounted on the lower substrate.

8 Claims, 8 Drawing Sheets

LIGHT EMITTING DIODE PRINT HEAD

TECHNICAL BACKGROUND

The present invention relates to a light emitting diode print head for electrophotography, and more particularly to a dynamic drive light emitting diode print head comprising an upper and a lower substrates that are joined together.

Generally, the light emitting diode print head is employed in a non-impact printing mechanism, and comprises a plurality of chips each having a plurality of light emitting diodes arrayed. Parts of a charged body are discharged so that the light beams produced by the light emitting diodes of the chips may be focused on the surface of the drum through the self-focus lens array. The drum is rotated so as to pass the discharged parts through a developing means, transferring means and fixing means, thus printing images on paper.

There are generally two methods for driving the light emitting diode array chips, i.e. the static drive method and dynamic or matrix drive method. In the static drive method, a plurality of drive integrated circuits (hereinafter referred to as drive IC) are mounted on both or either side of the light emitting diode array chips so as to cause the bits of the drive ICs to respectively drive the light emitting diodes. In the dynamic drive method, there are simultaneously driven a plurality of light emitting diodes connected in parallel to each of the bits of one or more drive ICs, and the wiring between the drive ICs and the light emitting diodes constitutes a matrix, thus the method often being called the matrix drive method.

Referring to FIG. 1, illustrating a conventional light emitting diode print head for the dynamic drive method, a lower glass substrate 6 has common electrode 2 and individual electrode wiring 4. On the lower glass substrate 6 is mounted an insulating layer 8, on which in turn are mounted a plurality of light emitting diode array chips 10. A self-focus lens array 12 is mounted over the light emitting diode array chips 10. The under surface of the lower glass substrate 6 contacts a heat sink 11. A case 14 encloses the heat sink 11, lower glass substrate 6 and insulating layer 8 mounting the light emitting diode array chips 10 except the self-focus lens array 12.

Meanwhile, a drive IC 16 for driving the light emitting diode chips 10 is mounted on both or either end portion of the lower substrate 6 with the bits connected to the individual electrode wiring 4. The light emitting diode array chips 10 are connected to the common electrode 2 by means of epoxy resin or direct contact. The width of the insulating layer 8 amounts to about a half of the width of the lower substrate 6, and each of the electrode pads of the light emitting diode array chips 10 is electrically connected to the individual electrode wiring 4 by means of wire bonding. The common electrode 2 and the signal part of the drive IC 16 are connected to a flexible printed circuit, and then to a external drive circuit constructed separately from the light emitting diode print head, thus being connected to the system via the connector of the external drive circuit.

Referring to FIG. 2 for illustrating an enlarged view of the portion A of FIG. 1, the conventional light emitting diode print head more specifically comprises the lower glass substrate 6 mounting the common electrode 2 and individual electrode wiring 4, the insulating layer 8 laid on the upper surface of the lower substrate 6, a plurality of the light emitting diode array chips 10 mounted on the insulating layer 8, and wire bonding 20 for connecting the electrode pads 18 and the individual electrode wiring 4.

Referring to FIG. 3 for illustrating a cross section of the light emitting diode print head taken along line a—a' of FIG. 2, there are shown the lower substrate 6 having the common electrode and individual electrode wiring, insulating layer 8 laid on the upper surface of the lower substrate 6, the width of the insulating layer amounting to about a half of the width of lower substrate, and a plurality of light emitting diode array chips 10 mounted on the insulating layer 8 and connected to the individual electrode wiring (not shown in FIG. 3) via the wire bonding 20.

There is shown an equivalent circuit of the conventional light emitting diode print head. The bits of the drive IC are connected to the individual electrode wiring 4. Dynamic wiring section 22 comprises a plurality of light emitting diode array chips 10 each consisting of a plurality of light emitting diodes connected to the individual electrode wiring 4. The external drive circuit section 30 comprises a control circuit 24 and a plurality of transistors 26 each connected to corresponding light emitting diode array chip 10. The control signal, print data and selection signal of the system are connected to the wiring section 22 via the control circuit 24. Each transistor 26 of the external drive circuit section 30 has the base connected to the selection data of the control circuit 24 with the collector and emitter respectively connected to the common electrode 2 of the light emitting diode array chip and ground voltage.

In operation, if the print data and selection data are respectively applied through the control circuit 24 to the input of the drive IC 16 and the bases of the transistors, light is emitted only from the light emitting diode of the light emitting diode array chip connected to the transistor selected by the selection data. Of course, the light emitting diode that emits the light are those selected simultaneously by the print data. For example, the selection data SDn—1 corresponding to the "n—1"-print data PDn—1 is applied to the "n—1"th transistor, light is emitted only from the light emitting diode corresponding to the "n—1"th print data PDn—1 of the "n—1"th light emitting diode array chip.

In such a dynamic drive method, if only one drive IC is used, n times sequences are required to print a line. If two drive ICs are used, $$\frac{n}{2}$$

times sequences are required to print a line because of turning on two transistors and two light emitting diode array chips.

The light emitting diode print head for such a conventional dynamic drive method needs a number of connector parts because the head substrate section and the external drive circuit section are separated from each other. Furthermore, the electrical connection between the common electrode and the light emitting array chips is achieved by using epoxy resin or direct contact, thereby increasing the possibility of a short circuit.

In addition, insulating layer should be employed to insulate the lower substrate and the light emitting diode array chips, thus increasing the processing steps of fabrication. Further, when mounting the light emitting diode array chips on the insulating layer, it is essential to make a precise alignment between the electrode pads of the chips and the individual electrode wiring.

Moreover, because of simultaneously forming the common electrode and individual electrode wiring in the lower substrate, the remaining area of the substrate except the area occupied by the common electrode is too limited to contain the expanded individual electrode wiring when fabricating a light emitting diode print head of high resolution, so that it is impossible to achieve the straight wire bonding.

The connection area between the common electrode and the light emitting diode array chips is also too limited to increase the current flow in order to enhance the light output. Besides, it is very limited to increase the printing speed because the drive IC should be mounted on either end portion of the lower substrate.

SUMMARY OF THE INVENTION

It is an object of the present invention to provide a light emitting diode print head, wherein the head substrate and the external drive circuit are integrally formed.

It is another object of the present invention to provide a light emitting diode print head whose fabrication processing steps are minimized.

It is still another object of the present invention to provide a light emitting diode print head which facilitates the assembly together with wire bonding.

It is a further object of the present invention to provide a light emitting diode print head which facilitates the control of the printing speed.

According to the present invention, a light emitting diode print head comprises a lower substrate having individual electrode wiring, and an upper substrate having a central transversely elongated opening, common electrodes, selection signal lines and print data lines, wherein the upper substrate is mounted on the lower substrate with light emitting diode array chips, at least one drive IC and external selection circuit mounted together thereon.

According to one aspect of the present invention, the connection area between the common electrode and the light emitting diode array chips is maximized.

According to another aspect of the present invention, the light emitting diode array chips are mounted on one side region of the transversely elongated opening of the upper substrate, while the drive IC is mounted on the other side region.

BRIEF DESCRIPTION OF THE ATTACHED DRAWINGS

A more complete appreciation of the invention, and many of the attendant advantages thereof, will be readily apparent by reference to the following detailed description when considered in conjunction with the accompanying drawings in which like members indicate the same or similar components, wherein.

DETAILED DESCRIPTION OF A PREFERRED EMBODIMENT

Figure 5:
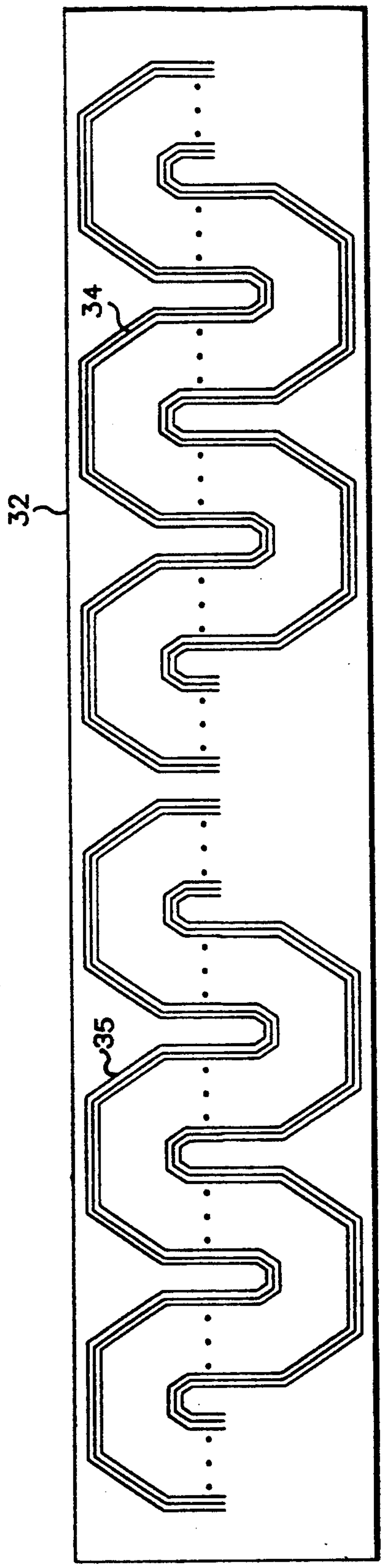
FIG. 5 is a plane view of the lower substrate of a light emitting diode print head according to the present invention.

Referring to FIG. 5, there are formed on the upper surface of the lower substrate 32 two individual electrode wirings 34 and 35 of undulated form symmetrically arranged along the length of the lower substrate so as to respectively face two drive ICs.

Figure 6:
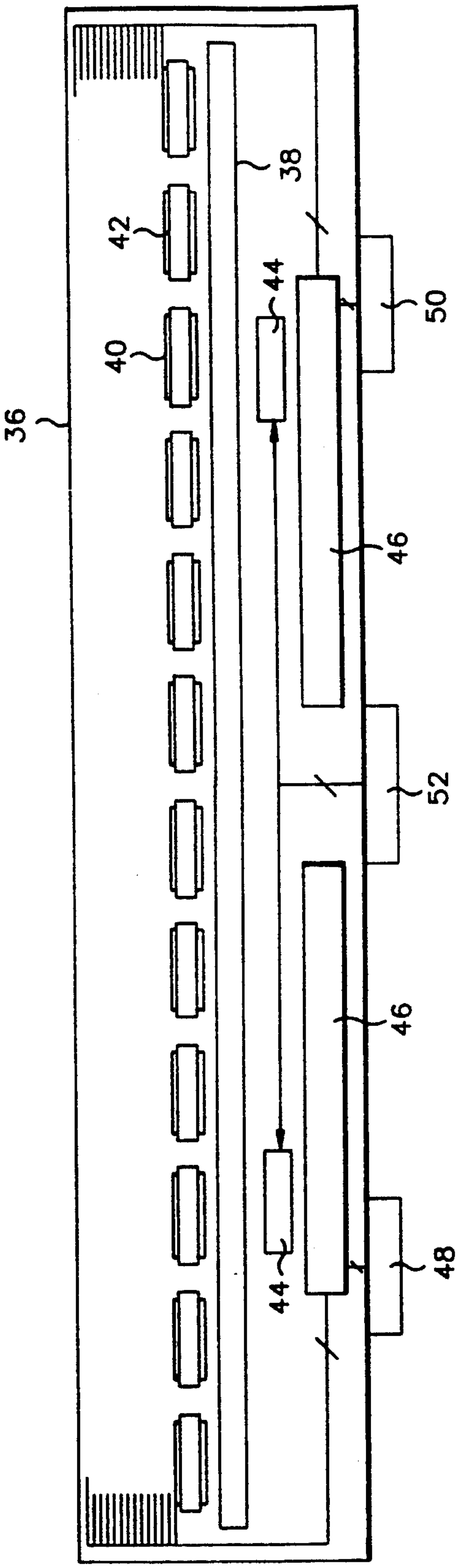
FIG. 6 is a plane view of the upper substrate of the light emitting diode print head according to the present invention.

Referring to FIG. 6, the upper substrate 36 has a central transversely elongated opening 38. On one side region of the opening 38 are aligned a plurality of common electrodes 40 along the elongated opening 38. A light emitting diode array chip 42 is mounted on each of the common electrodes 40. Drive ICs 44 are mounted on the other side region of the elongated opening 38. Two drive circuits 46 for driving $$\frac{n}{2}$$

light emitting diode array chips 42 and first, second and third connectors 48, 50 and 52, for system connection are also mounted on the upper substrate 36. The first and second connectors 48 and 50 are common electrode selection connectors for connecting a selection data from the system to the drive circuits. The third connector 52 serves to connect a control data and print data from the system to the drive ICs 44.

As shown in FIG. 6, since the common electrodes are mounted beneath the light emitting diode array chips 42, there is secured sufficient space for the common electrodes, so that the current flow may be sufficiently increased in order to enhance the light output. In addition, the drive ICs 44 may be freely mounted in any positions between the elongated opening 38 and the drive circuits 46.

Figure 1:
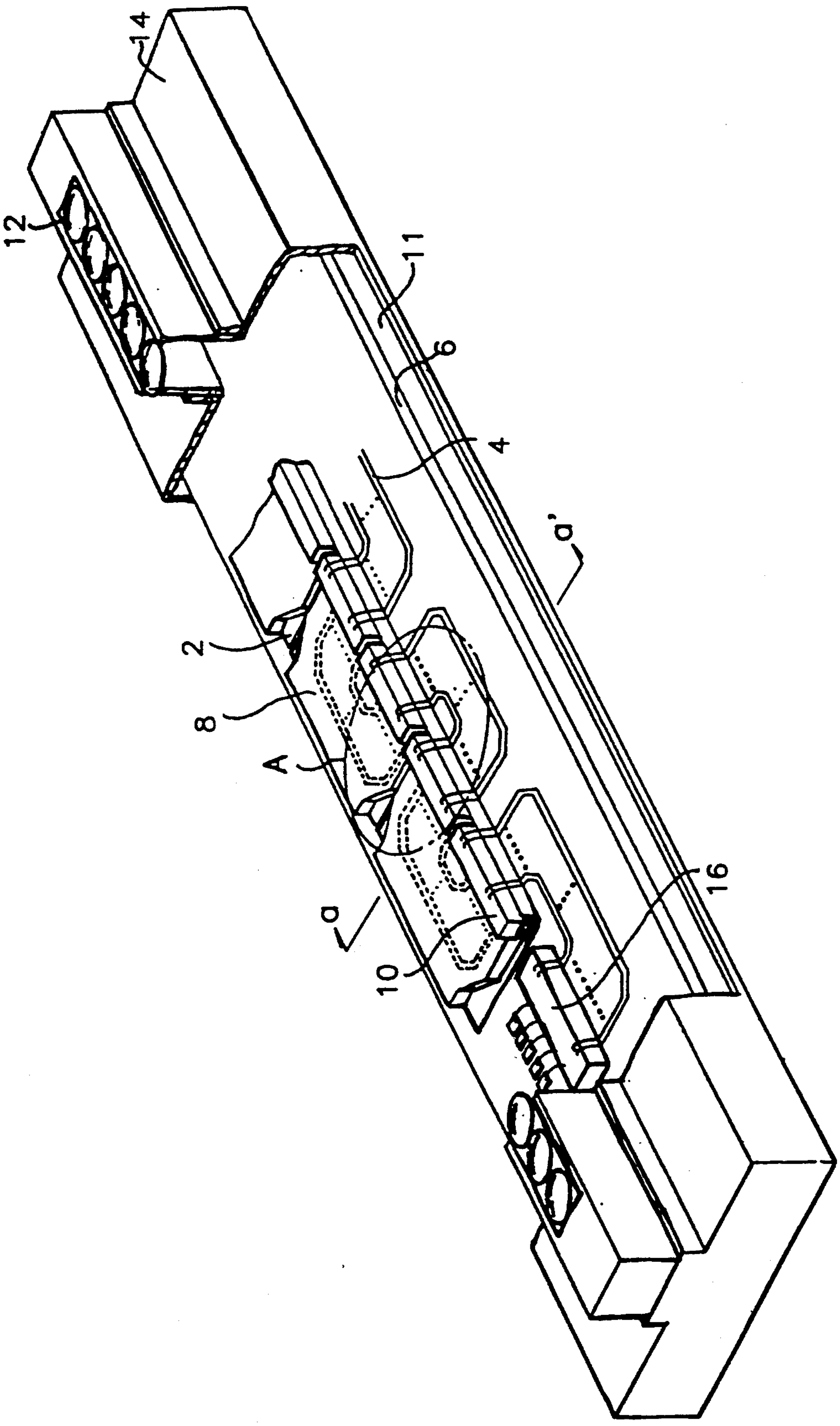
FIG. 1 is a perspective view of a conventional light emitting diode print head partially cut out to show the structure thereof.
Figure 2:
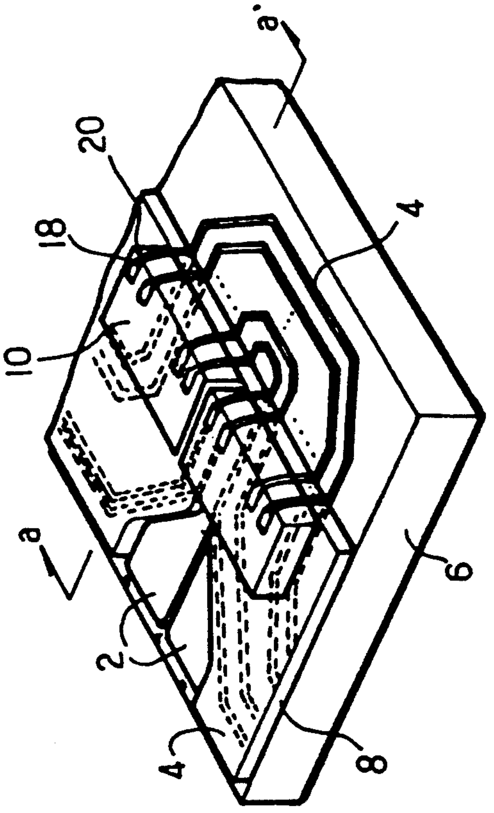
FIG. 2 is a detailed perspective view of a part of FIG. 1.
Figure 3:
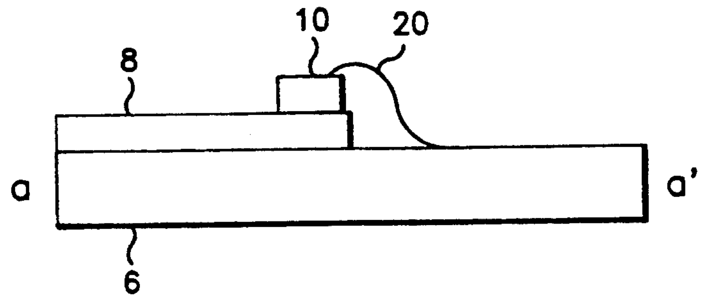
FIG. 3 is a cross sectional view taken along line a—a' of FIG. 2.
Figure 8:
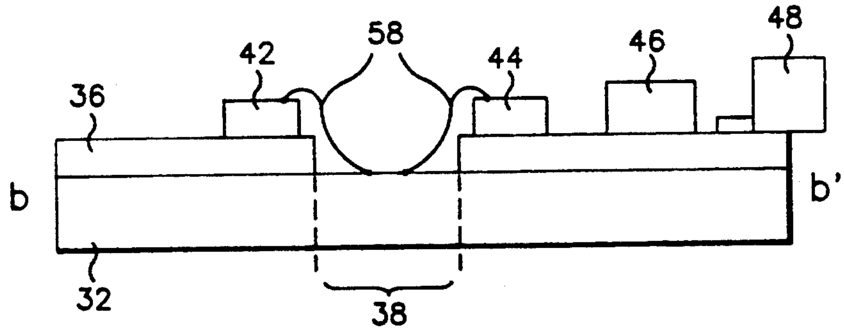
FIG. 8 is a cross sectional view taken along line b—b, of FIG. 7.
Figure 4:
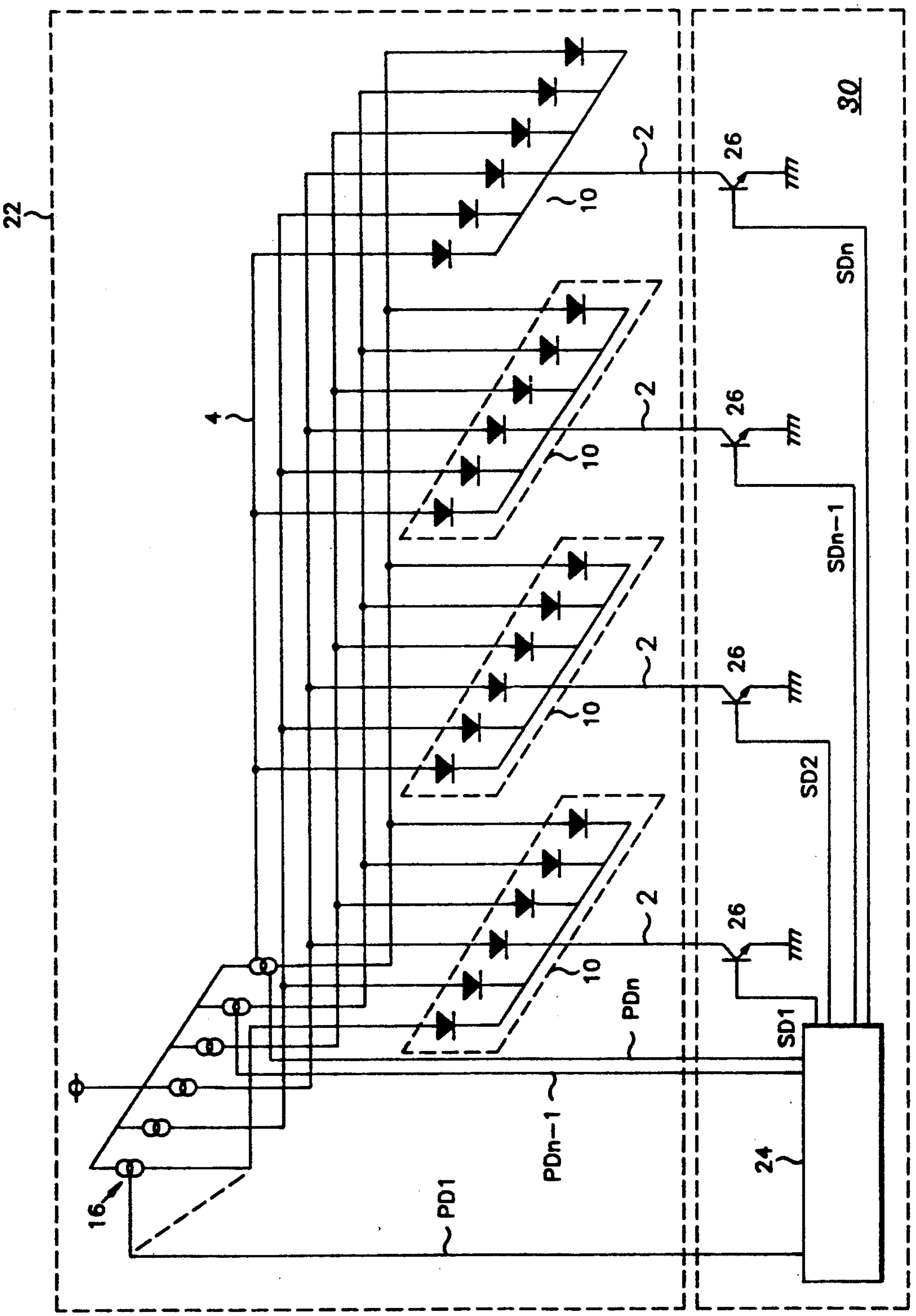
FIG. 4 is an equivalent circuit of FIG. 1.
Figure 7:
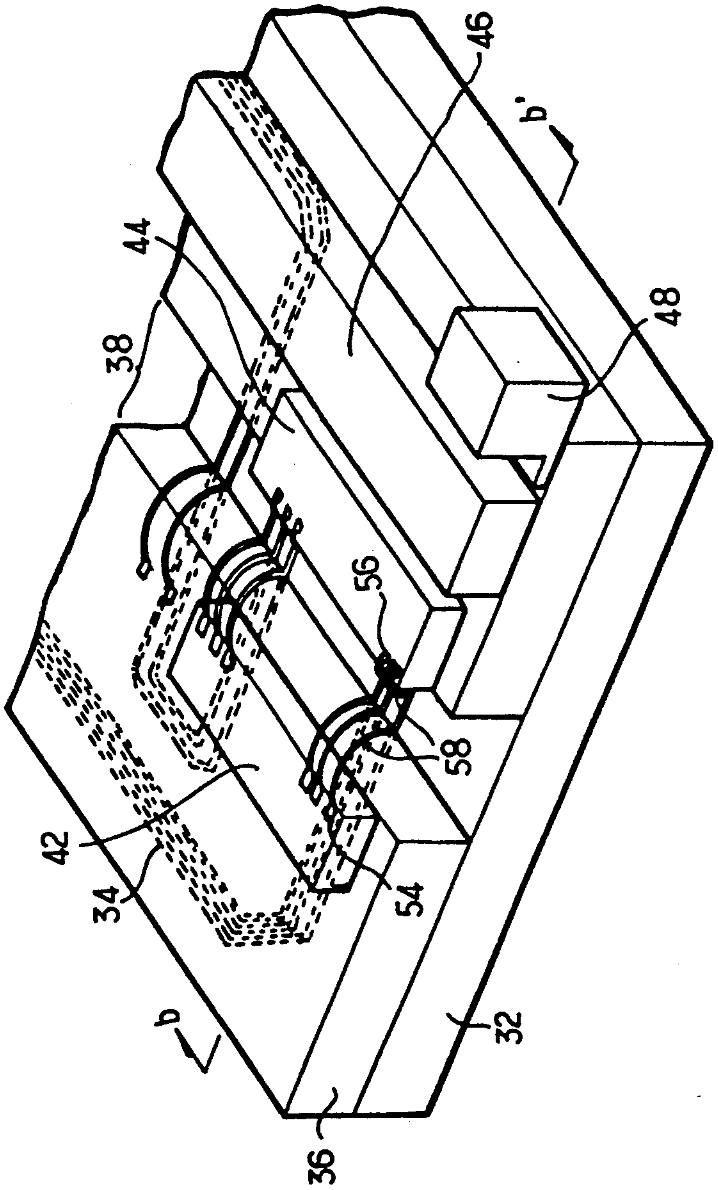
FIG. 7 is a detailed perspective view of a part of the light emitting diode print head according to the present invention.

As shown in detail in FIGS. 7 and 8, there is mounted on the lower substrate 32 having only the individual electrode wiring 34 the upper substrate 36 having the light emitting diode array chip 42, drive IC 44, drive circuit 46 and connector 48 mounted in order to construct the print head. It is noted that the electrode pads 54 and 56 of the light emitting diode array chip 42 and drive IC 44 are electrically connected to the individual electrode wiring 34 exposed through the elongated opening 38 of the upper substrate 36 by means of wire bonding. In this case, the upper and lower substrates 36 and 32 are made to have the same size, so that it is not necessary to make an additional effort to precisely align the electrode pad 54 of the light emitting diode array chip with the individual electrode wiring.

Figure 9:
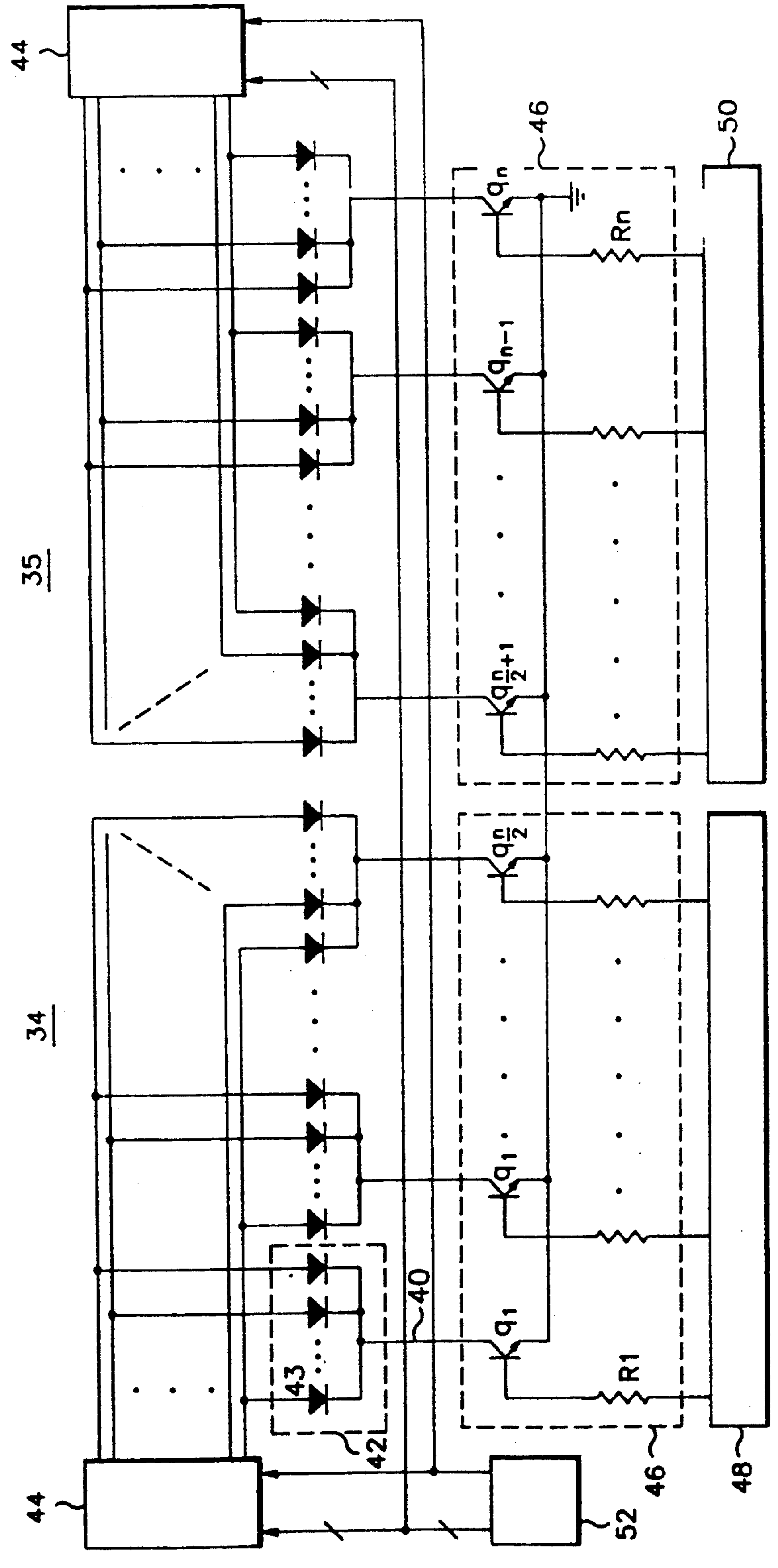
FIG. 9 is an equivalent circuit of the light emitting diode print head according to the present invention.

Referring to FIG. 9 for illustrating an equivalent circuit of the light emitting diode print head according to the present invention, there are shown a plural number n of the light emitting diode array chips 42 each having a plural number m of the light emitting diodes 43. The light emitting diodes 43 are connected with the drive ICs of m bits in a matrix form by means of the individual electrode wirings 34 and 35.

The drive IC signalling connector 52 is to apply the print data and the control signal to the drive ICs 44. The external drive circuits 46 are arranged between the common electrodes 40 of the light emitting diode array chips 42 and the common electrode selection connectors 48, 50. The external drive circuit 46 comprises n Darlington transistors $q_1, q_2 \ldots q_n$ with the collectors and emitters respectively connected to the common electrode 40 and ground voltage, and n resistors $R_1$, $R_2$, $\ldots R_n$ connected between the bases of the Darlington transistors and the common electrode selection connectors 48 and 50. The resistors are to limit the current flows through the Darlington transistors in order to prevent the failure of the transistors.

Figure 10:
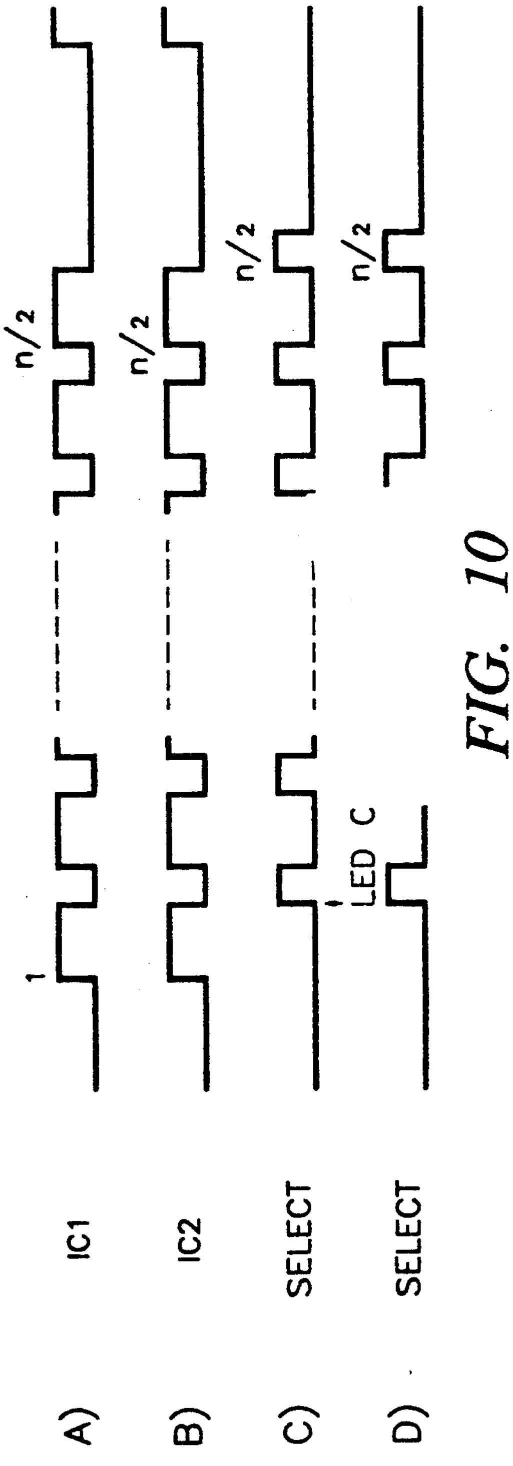
FIGS. 10A to 10D illustrates the waveforms of the timing pulses for illustrating the operation of the light emitting diode print head according to an embodiment of the present invention.

FIGS. 10A and 10B represent the waveforms of the timing pulses when simultaneously operating the two drive ICs, where $$\frac{n}{2}$$

clock pulses each have a serial print data of m bits. FIGS. 10C and 10D respectively represent $$\frac{n}{2}$$

clock pulses containing the selection data input to the common electrode selection connector.

FIGS. 11A and 11B represent the waveforms of the timing pulses when sequentially operating the two drive ICs. In FIG. 11A showing n clock pulses containing the serial print data input to the drive IC, the first to $$\text{“}\frac{n}{2}\text{”th}$$

clock pulses are applied to the first drive IC, and the remaining $$\text{“}\left(\frac{n}{2}\right)+1\text{”th}$$

to "n"th clock pulses to the second drive IC. FIG. 11B specifically represents n clock pulses containing the selection data simultaneously input to the common electrode selection connectors.

Hereinafter, the operation of the inventive print head will now be described.

The print data A and B of m bits and control signal are continuously input through the drive IC signalling connector 52 to the drive IC 44. Meanwhile, the number of the input data lines is proportional to the number of the drive ICs. Namely, two drive ICs 44 need two data lines, and when the two drive ICs are simultaneously operated, the number of selection sequences is $$\frac{n}{2}.$$

If all the print data of n bits are stored into the drive IC 44, the data are transferred in parallel to the number n of the light emitting diode array chips 42. Simultaneously, the Darlington transistors are selectively turned on by the input of the selection data corresponding to the print data connected to the system.

As a result, the light emission is produced only from the light emitting diode that is chosen by the print data and belongs to the light emitting diode array chip connected to the Darlington transistor that is turned on. This procedure is repeated $$\frac{n}{2}$$

times in order to print a line.

Figure 11:
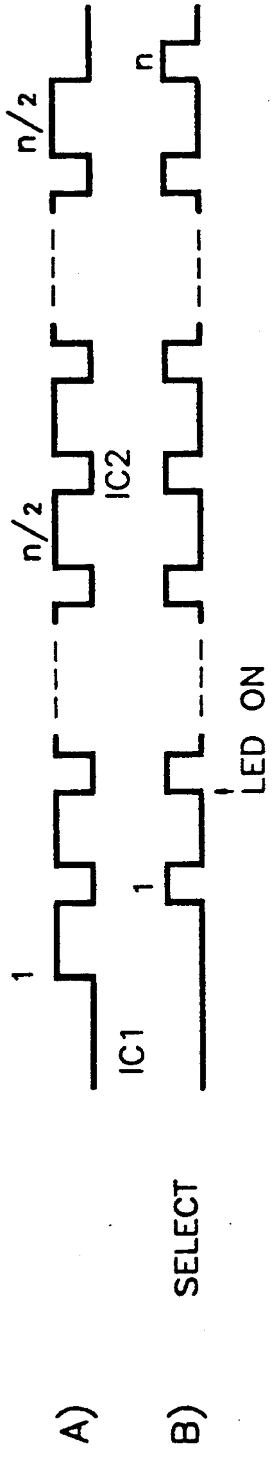
FIGS. 11A and 11B illustrates the waveforms of the timing pulses for illustrating the operation of the light emitting diode print head according to another embodiment of the present invention.

Of course, the sequential operation of the drive ICs, as shown in FIG. 11, may be described on the basis of the same principle. In this case, the printing speed is the same as in using a single drive IC because one of the drive ICs is not operated during the other being operated.

The number of the drive ICs may be arbitrarily chosen according to the desired printing speed. For example, as the number of the drive ICs that are simultaneously driven are increased, the printing speed is increased. In this case, the individual electrode wiring for the n light emitting diode array the number of the drive ICs. Namely, if there are used eight drive ICs, the individual electrode wiring is divided into eight sections. Of course, each of the drive ICs corresponds to one of the sections. Thus, it is possible to achieve a high printing speed as in the static drive method.

The advantages resulting from the present invention may be briefly summarized as follows:

The connectors for connecting the head substrate and the external drive circuits are considerably reduced because the external drive circuits are mounted on the head substrate.

The separate insulating layers that are needed for insulating the light emitting diode array chips from the lower substrate in the conventional print head is eliminated because the upper substrate having the light emitting diode array chips mounted is directly mounted on the lower substrate, thus reducing the number of the processing steps of fabrication.

The electrode pads of the light emitting diode array chips are automatically aligned with the individual electrode wiring without special aligning procedure, because the sizes of the upper and lower substrates are the same.

The lower substrate has only the individual electrode wiring mounted and the upper substrate has the common electrodes mounted beneath the light emitting diode array chips, so that the space for the individual electrode wiring may be sufficiently secured so as to connect the wiring and the array chips by straight wire bonding even in the print head of high resolution. Thus, the current flow for obtaining a desired amount of light emission is not limited. The number of the drive ICs mounted may be freely chosen according to the desired printing speed.

While the foregoing provides a full and complete disclosure of the preferred embodiments of the present invention, various modifications, alternate constructions and equivalents thereof may be employed without departing from the true spirit and scope of the invention. Therefore, the above description and illustration should not be construed as limiting the scope of the invention, which is defined by the appended claims.

I claim:

1. A light emitting diode print head comprising:

an upper substrate having a transversely elongated opening;

a plurality of common electrodes arranged in a row on a first side region of said transversely elongated opening;

a plurality of light emitting diode array chips each mounted on a different one of said plurality of common electrodes;

a plurality of drive circuits arranged on a second side region of said transversely elongated opening;

a plurality of drive chips mounted on said upper substrate between said transversely elongated opening and said drive circuits, each of said plurality of drive chips being in one to one correspondence with a different one of said plurality of drive circuits;

a lower substrate divided into a plurality of wiring regions, said plurality of wiring regions each being in one to one correspondence with a different one of said plurality of drive chip means; and a plurality of individual electrode wirings of each disposed on a different one of said plurality of wiring regions, said plurality of individual electrode wirings arranged along a length of said lower substrate, each of said plurality of individual electrode wirings corresponding to a different electrode pad of each of said plurality of light emitting diode array chips.

2. A light emitting diode print head as claimed in claim 1, wherein said plurality of drive chips is arranged on said upper substrate above the wiring regions of said lower substrate and between said transversely elongated opening and said plurality of drive circuits.

3. A light emitting diode print head as claimed in claim 1, wherein each of said light emitting diode array chips is comprised of an electrode pad connected to a different one of said individual electrode wirings by straight wire bonding through said transversely elongated opening.

4. A light emitting diode print head as claimed in claim 3, wherein each of said plurality of drive chips is connected to a different one of said plurality of individual electrode wirings by straight wire bonding through said transversely elongated opening.

5. A light emitting diode print head as claimed in claim 1, wherein said upper substrate is comprised of:

a plurality of common electrode selection connectors for supplying a common electrode selection signal to said drive circuits, each of said plurality of common electrode selection connectors being in one to one correspondance with each of said plurality of drive chips, and a drive chip signalling connector for supplying print data and control signals to said plurality of drive chips.

6. A light emitting diode print head as claimed in claim 1, wherein said upper substrate is mounted on said lower substrate.

7. A light emitting diode print head as claimed in claim 1, wherein an imaginary line longitudinally bisecting said transversely elongated opening is parallel with said row of said plurality of common electrodes.

8. A light emitting diode print head as claimed in claim 1, wherein an outer edge of said lower substrate is coextensive with an outer edge of said upper substrate.

* * * * *

UNITED STATES PATENT AND TRADEMARK OFFICE

CERTIFICATE OF CORRECTION

PATENT NO. : 5,179,396
DATED : January 12, 1993
INVENTOR(S) : Seung-Sik Jeong

It is certified that error appears in the above-indentified patent and that said Letters Patent is hereby corrected as shown below:

Column 1, Line 18, Change "developing means" to --developer--, After "transferring", Change "means" to --device-- ;
Line 39, After "turn", Change "is" to --are-- ;
Column 2, Line 44, Before "print", Insert --th-- ;
Column 4, Line 10, Change "b-b," to --b-b'-- ;
Line 32, Before "aligned", Change "are" to --is-- ;
Line 43, After 52, Delete comma "," ;
Column 5, Line 7, After "there", Change "are" to --is-- ;
Column 6, Line 34, After "array", Insert --chips may be divided into a number of sections corresponding to-- .

IN THE CLAIMS

Column 7, Line 31, After "wirings", Delete "of".

Signed and Sealed this

Fourteenth Day of November, 199

Attest:

BRUCE LEHMAN

*Attesting Officer* *Commissioner of Patents and Trademarks*